Feb. 3, 1970 R. W. STOWE 3,493,753
ULTRAVIOLET DETECTION SYSTEM USING UV DETECTOR TUBE WITH
D-C BIASED NONSYMMETRICAL ELECTRODE CONFIGURATION
Filed Aug. 11, 1967 2 Sheets-Sheet 1
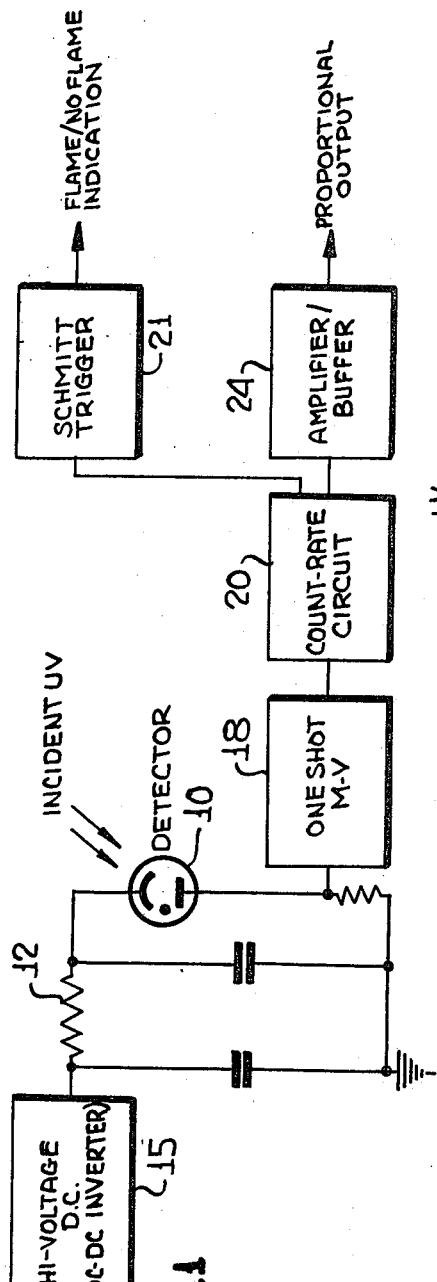
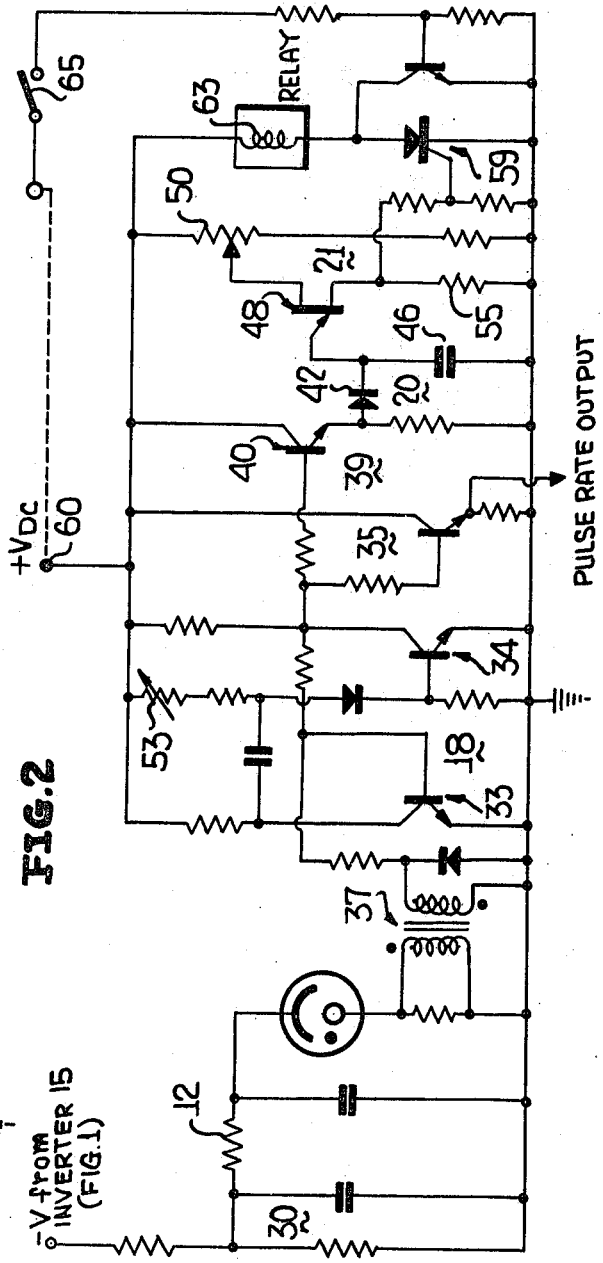
INVENTOR
RICHARD W. STOWE
BY Hurvitz, Rose & Greene
ATTORNEYS

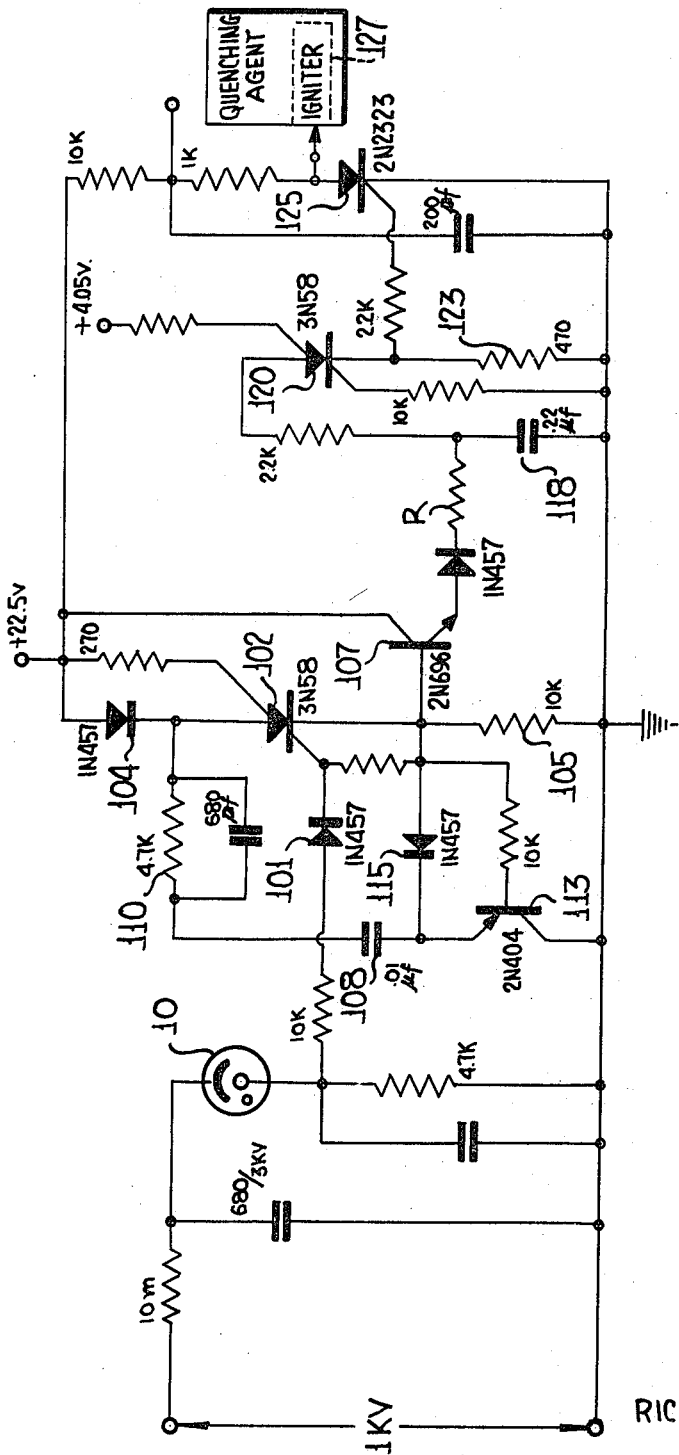

United States Patent Office 3,493,753
Patented Feb. 3, 1970

3,493,753
ULTRAVIOLET DETECTION SYSTEM USING UV DETECTOR TUBE WITH D-C BIASED NON-SYMMETRICAL ELECTRODE CONFIGURATION
Richard W. Stowe, Falls Church, Va., assignor to Melpar, Inc., Falls Church, Va., a corporation of Delaware
Filed Aug. 11, 1967, Ser. No. 659,993
Int. Cl. G01j 1/10
U.S. Cl. 250—83.3                                    5 Claims

ABSTRACT OF THE DISCLOSURE

An ultraviolet detection system utilizing a low-power ionizable gas filled detector having a two-electrode configuration which is nonsymmetrical in that one electrode acts permanently as a photo-cathode while the other is the anode, and capable of resolving single ultraviolet photons, the pulse produced by avalanche current following incidence of a UV photon on the detector triggering a one-shot multivibrator to provide square pulses to an emitter follower. The latter provides a single output for each square pulse and the output pulses are fed to an integrator for developing a voltage proportional to the rate of the pulses. This voltage is used to trigger a circuit which provides a single decision pulse to actuate an alarm or other indicator which may be remote from the detection circuit electronics.

Background of the invention

The present invention relates generally to radiation detection systems and more particularly to an ultraviolet detection system in which each of the pulses generated by a low-power detector tube of nonsymmetrical electrode configuration is detected by a rapidly responding electronics system to provide a suitable signal to an indicator or alarm system.

In the past, ultraviolet detection systems have typically utilized the average (integrated) photoelectric current from a radiation detector operated by A-C bias voltages. Power gain is accomplished by allowing sustained conduction in the detector for the remainder of each half cycle in which it is activated, and this current is employed to actuate a relay. Since average current is employed in the indicator system, there is a relatively narrow operating range of incidence and flux. That is to say, above a fixed flux level of intensity, there is no increase in output current from the detector tube, and below a certain fixed level of intensity, there is insufficient flux to produce a useful current. Unequal values of current are produced by incident photons since these photons may strike the electrodes at any time during a half cycle. Because of the A-C bias voltages, both electrodes act alternately as emitter, and must therefore be identical in structure and material. It is apparent, then, that prior art systems using symmetrical electrode tubes operated on A-C voltages cannot provide a measurement indication proportional to incident ultraviolet radiation. When relays are employed indirectly as indicators, there is a minimum current level below which the relay will not operate, and this level is temperature-sensitive.

With the realization that the detector tube may be triggered at any instant during that portion of each applied voltage pulse in which the applied voltage is above the firing potential of the tube, as a result of incident ultraviolet radiation, and thus that the duration of the discharge pulses will vary substantially, producing nonuniform and substantially unreliable response, it has been suggested that each discharge pulse from the detector tube be utilized to trigger a one-shot multivibrator irrespective of the duration of the pulse. Despite the non-uniformity of input pulses, the one-shot multivibrator responds to each to provide a uniform output pulse of predetermined magnitude and duration, each of which is employed to energize a circuit or load device of desired form. Such a system is shown, for example, in U.S. Patent No. 3,129,-332, issued Apr. 14, 1964, to Leen.

Despite these prior art suggestions, the operation of the detector tube on the basis of average current still results in the production of unequal values of current from the detector tube and nonuniformity of triggering of the one-shot multivibrator. Moreover, such systems do not provide a measurement indication proportional to incidence of ultraviolet energy and further require that the response of the one-shot multivibrator be set, by adjustment of multivibrator timing, to insure that each output pulse ends before a succeeding discharge of the detector tube can be initiated.

Summary of the invention

In accordance with an embodiment of the present invention, the ultraviolet detection system includes a low-power photodiode detector having a D-C biased non-symmetrical electrode configuration in which there is no reversal of function of the electrodes on a periodic basis as occurs when the electrodes are driven by A-C voltage, and hence in which there need not be any correspondence between the structure and arrangement of the electrodes with respect to the working area of the detector tube. In particular, the emitter or cathode area of the detector tube is substantially increased over the area of the cathode of prior art ultraviolet detector tubes, and hence is extremely sensitive to incoming UV radiation. Moreover, the tube configuration is such that the overall volume of the detector is reduced, whereby to substantially reduce the sensitivity of the tube to undesired radiation in the same region of the spectrum, e.g., from cosmic sources, and hence to render the detector discriminatory against undesired background. The detector tube is capable of resolving single ultraviolet photons and hence produces uniform pulses for each such incident photon. Since the tube does not operate on the principle of average current output during an alternating cycle, a rapid response capability is available, i.e., the detector tube is responsive to UV photons of much less time separation than is possible using prior art tubes of the symmetrical electrode configuration type.

A high D-C potential difference is applied across the electrodes of the detector tube by use of a D-C to D-C inverter coupled to a suitable source of low direct voltage. The detector may be temperature-controlled, in an elevated temperature environment, by maintaining it at a somewhat lower temperature to reduce thermal breakdowns caused by thermally-emitted electrons at the cathode.

The output pulses from the detector tube are applied to a one-shot multivibrator, each pulse triggering the one-shot to supply uniform output pulses to a counter circuit which may be employed to trigger a suitable indicator. In particular, the ultraviolet detection system is especially appropriate for flame detection and offers a much faster response to outbreak of a fire than is available using prior art systems.

It is therefore a principal object of the present invention to provide an improved high response ultraviolet detection system in which measurement indication is proportional to incident ultraviolet energy.

It is another object of the invention to provide as ultraviolet detection system in which uniform response is achieved for each incident photon ultraviolet radiation.

Still another object of the present invention is to provide an ultraviolet detection system in which a low-power nonsymmetrical electrode detector tube is employed and is followed by subtantially completely solid-state measurement and indicating circuitry.

A further object of the invention is to provide an ultraviolet detection system employing frequency-to-pulse techniques and spectral measurements at low-power levels in a manner similar to that utilized in Geiger-Mueller counting.

Brief description of the drawings

The above and still further objects, features and attendant advantages of the present invention will become apparent from a consideration of the following detailed description of a preferred embodiment thereof, especially when taken in conjunction with the accompanying drawings in which:

FIGURE 1 is a block diagram of an ultraviolet detection system in accordance with the present invention; and FIGURE 2 is a schematic diagram of one suitable embodiment of the system of FIGURE 1, and FIGURE 3 is a schematic diagram of another suitable embodiment of the system of FIGURE 1.

Description of a preferred embodiment

Referring now to FIGURE 1, ultraviolet ignition detection systems according to the present invention are especially suitable for flame monitoring and detection, and preferably utilize a detector tube 10 of the type disclosed in my co-pending application entitled "Ultraviolet Detector," Ser. No. 660,046 filed on even date herewith. In essence, that detector comprises a radiation permeable tube envelope composed of ultraviolet transmitting quartz or other suitable UV window material, housing a pair of electrodes arranged in a nonsymmetrical configuration in that one electrode operates continuously as the photocathode, while the other is operated as the anode. The cathode is disposed against and is supported by the inner surface of the tube envelope and offers substantial coverage of that surface to provide a wide-angle field of view for incoming ultraviolet radiation. The two electrodes are D-C biased to provide a high potential difference therebetween. In operation, the incidence of a single photon of ultraviolet radiation in the region of the spectrum from approximately 1,500 angstroms to approximately 2,800 angstroms, for example, is sufficient to cause photoelectric emission from the cathode, as a result of appropriate selection of work function of cathode material. Several suitable cathode materials are set forth in my aforementioned co-pending application. As is well known, the energy imparted by the photon to an electron or electrons of the cathode material is sufficient to overcome the work function of the cathode and thus permit liberation of the electrons.

The photoelectrons are accelerated by the field between the electrodes and initiate an ionization avalanche in the gas (preferably hydrogen) with which tube 10 is filled, to produce a comparatively large current which flows through an external resistor 12. As current flow increases, the potential drop across resistor 12 rises rapidly and if the resistor is connected to the high-voltage D-C source biasing the detector electrodes, such source preferably comprising a D-C to D-C converter 15, the voltage across the electrodes is decreased below the extinction voltage and current ceases to flow, returning the detector tube to the steady state. This detector activity results in the production of pulses in the series circuit which can be monitored by means of a pulse-rate circuit. While little amplification of pulses is required, clipping and shaping improves the pulse rate circuit operation.

Each output pulse of the tube is applied to a one-shot multivibrator 18, the pulses being substantially uniform as a result of the structure and operation of the tube itself and its driving circuitry. In response to each of the incoming pulses, the one-shot multivibrator produces respective corresponding output pulses of uniform characteristics in respect to amplitude and width, for application to a count-rate circuit 20. The count rate circuit is of a form suitable for developing a signal proportional to the rate at which the pulses arrive from the one-shot multivibrator.

In a preferred embodiment of the invention, these pulses are used to develop a voltage which is employed to trigger a flame or no-flame indication, the trigger circuit 21 being of a type which will make that decision based on the level of the voltage generated by the count-rate circuit, i.e., the decision based upon the level of the output voltage of count-rate circuit 20 relative to a predetermined threshold level. Accordingly, trigger circuit 21 may be a conventional Schmitt trigger.

The output of the count-rate circuit is also applied to an amplifier and buffer unit 24 to produce an output signal directly proportional to intensity of ultraviolet radiant energy incident upon the detector tube.

There are obviously available a wide variety of system alternatives or modifications which may be useful in improving system operation in a specific environment or to achieve a specific result. For example, the detector may be temperature controlled in an elevated temperature environment to reduce variations resulting from thermal effects at the cathode (e.g., spurious breakdowns caused by thermally emitted electrons) by maintaining the detector at a temperature lower than normal ambient. Temperature compensation may also be employed to stabilize the output of the inverter over a wide range of temperatures, or to reduce inverter output for higher operating temperatures. The system may also be internally or remotely compensated for background radiation (e.g., cosmic), as by appropriate adjustment or compensation of the count-rate circuit to account for and remove anticipated build-up of charge or other stored quantity resulting from spontaneous emissions of UV energy from natural or fabricated sources other than flames, for example. A programmed reset may be used in conjunction with the indicator. These and other variations are deemed obvious from a consideration of the present disclosure, anl are intended to fall within the confines and limits of my invention.

Referring now to FIGURE 2, the high-voltage D-C obtained from the inverter circuit is applied via a voltage divider and filter network 30 and resistor 12 to the electrodes of the ultraviolet detector tube 10. The output pulses deriving from the detector tube in response to incident ultraviolet photons are supplied to the one-shot multivibrator 18 comprising transistors 33, 34 and conventional connecting elements via a pulse transformer 37. The output of the one-shot multivibrator consists of uniform pulses of predetermined width and magnitude, each pulse generated in response to a pulse applied thereto via the transformer. The pulses from the one-shot are applied to the buffer stage 39 comprising transistor 40 connected in emitter follower configuration. The same pulses may also be applied to another emitter follower 35 for monitoring the pulse rate.

The output voltage from emitter follower 39 is applied to count-rate circuit 20 which inclues an integrator comprising diode 42 and capacitor 46, across the latter of which is developed a voltage whose level is proportional to the rate of arrival of pulses. The voltage developed across the capacitor is utilized to trigger a circuit 21 comprising unijunction transistor 48 which is biased by variable resistor 60 to set the desired decision level as to flame or no flame. Alternatively, the decision level may be adjusted by varying the pulse energy through adjustment of resistor 53 in the one-shot multivibrator.

A single decision pulse is thereby developed at resistor 55 in one of the base circuits of the unijunction transistor, and this decision pulse is employed to switch on the silicon controlled rectifier (SCR) 59 by application to its gate electrode. When the SCR is rendered conductive, current flows from the source of biasing potential designated +VDC at terminal 60, through a relay coil winding 63 thus pulling in the relay and operating the alarm or other indicator (not shown).

An external manual reset switch 65 may be provided to reset the system following an alarm condition. It should be observed that there is no need to regulate the voltage of the D-C supply since the pulse circuit is a stable circuit.

An alternative circuit for implementing an ultraviolet detection system in accordance with the present invention is shown in FIGURE 3. This circuit is particularly advantageous in its low power consumption, high speed operation, and battery-powered capability. Component values and commercial designations are shown for the sake of example only, and are not intended as a restriction on the illustrated circuit or obvious variations therefrom.

Again, a low D-C voltage is applied to a high voltage D-C to D-C inverter, via a voltage regulator if desired, to produce a sufficiently high voltage for ignition of ionization avalanche in tube 10, in the manner previously described. A positive-going output pulse of about one microsecond (1μS.) duration is thereby generated by the detector tube circuit and is applied to the anode of diode 101 to turn on silicon controlled switch (SCS) 102. A conductive path is accordingly provided between the positive supply (+22.5 volts in this illustrative embodiment) and system ground via diode 104, SCS 102, and resistor 105. The voltage developed across resistor 105 is applied to the base electrode of transistor 107 to switch the latter to a conductive state.

It will be observed that the portion of the circuit in which an input pulse is applied to diode 101 and an output voltage taken from the "high" end of resistor 105 is, in effect, a low power, high speed monostable multivibrator. Capacitor 108, which is charged in advance of the SCS turn-on pulse by the trickle current from the positive supply, discharges through resistor 110 and SCS 102 (following the switching "on" of the SCS) to provide a holding current that maintains the SCS in its conductive state. When this holding current drops below the minimum value sufficient to sustain the SCS in conduction, it turns off and the output voltage across resistor 105 drops to zero. Transistor 113, which has been driven to cutoff by the voltage across resistor 105, reverts to its normally conductive state to again permit rapid charging of capacitor 108. Diode 115 prevents the charging of capacitor 108 through resistor 110 and transistor 113 from affecting the one-shot output voltage (which is zero or substantially so at this point) across resistor 105. Diode 104, in addition to allowing the flow of charging current to the capacitor, allows the anode voltage of SCS 102 to rise above the power supply voltage during capacitor discharge. I have observed practically no current draw from the power supply when no input pulse is appearing at the anode of diode 101.

The one-shot output pulses turn on transistor 107 to activate the count-rate circuit comprising resistor R and capacitor 118. The value of resistor R will vary according to the desired count to be established for triggering SCS 120 and the variations in component values from circuit to circuit. As is clear from a consideration of the circuit shown, capacitor 118 in conjunction with resistor R performs an integration in which it is incrementally charged each time an output pulse is generated by the one-shot multivibrator. Upon attainment of a predetermined "count" (i.e., stored voltage), the capacitor switches on SCS 120 to develop a voltage across resistor 123 of the trigger circuit, which in turn is applied to the gate electrode of silicon controlled rectifier (SCR) 125. The consequent switching on of the SCR supplies a firing voltage to an igniter 127, such as a matchhead, packaged with a pressurized quenching agent. In this manner, sensing of initial flame is an area monitored by the ultraviolet detection system results in the rapid detonation of a mild counter-explosion to disperse the quenching powder, which may be of any well known type, prior to any appreciable pressure build-up (explosion) or fire damage. This provides, in effect, an indication of intensity of the sensed UV radiation, in addition to instituting appropriate countermeasures.

Of course, the embodiment of FIGURE 3 may be used, as may the other embodiments, to initiate conventional flame control or fire quenching procedures, other than a mile quenching counter-explosion, such as activation of fire sprinklers, fire smothering foams, and/or triggering an alarm in a local fire station or security station.

I claim:

1. In an ultraviolet detection system, in combination with an ultraviolet detector tube filled with ionizable gas and having a non-symmetrical electrode configuration comprising a pair of electrodes at least the cathode of which is supported by the interior surface of the tube envelope and covers a substantial portion of the envelope, said electrodes being in concentric relationship, said cathode responsive to incidence of individual photons of ultraviolet radiation via said tube envelope to emit electrons therefrom and thereby trigger ionization avalanche discharge between said electrodes when a predetermined D-C potential is applied between said electrodes; a high D-C voltage source, means for applying the D-C voltage produced by said source across said electrodes of said tube, to permit digital response of said tube to each photon incident upon said cathode to produce a respective output pulse therefrom, means responsive to each said output pulse generated by said tube for shaping thereof, means responsive to the shaped pulses for developing a voltage level representative of the rate of occurrence of the shaped pulses, and means responsive to said developed voltage attaining a predetermined level for initiating an indication of intensity of ultraviolet radiation sensed by said tube in the region monitored by said detection system.

2. The invention of claim 1 in which said detection system is a flame monitoring system, further including a decision circuit for determining the presence or absence of flame as a source of the ultraviolet radiation incident on said cathode, means applying said developed voltage to said decision circuit, said decision circuit including means providing a threshold level for comparison with said applied developed voltage level by which to make said determination.

3. The invention according to claim 1 wherein said detection system is a flame monitoring system, and wherein said means for initiating an indication of intensity comprises means for instituting appropriate countermeasures to control a fire sensed by said system.

4. The invention according to claim 3 wherein said means for instituting appropriate countermeasures includes a disperasble fire-quenching agent, means for detonating a mild counter-explosion to disperse said quenching agent, and means responsive to said predetermined level of developed voltage for triggering said detonating means.

5. The invention according to claim 4 wherein said pulse shaping means comprises a monostable multivibrator including a semiconductor controlled switch responsive to each pulse generated by said tube to switch from a normally nonconductive state to a conductive state, a power supply, a capacitor coupled to said power supply for charging thereby to a predetermined voltage during each interval said switch is in said normally non-conductive state, said capacitor coupled to said switch for discharging therethrough upon assumption of said conductive state and for supplying holding current to maintain said switch in said conductive state upon expiration of the pulse generated by said tube, and resistive means coupled to said switch and to said power supply for developing a shaped pulse thereacross for each pulse generated by said tube.

References Cited

UNITED STATES PATENTS 3,161,774  12/1964  Pinckaers.

OTHER REFERENCES

General Electric Transistor Manual; 2.435; 1964.

RALPH G. NILSON, Primary Examiner

MORTON J. FROME, Assistant Examiner

U.S. Cl. X.R.

250—83; 307—274, 252